(12) United States Patent
Vaselaar

(10) Patent No.: US 10,974,896 B1
(45) Date of Patent: *Apr. 13, 2021

(54) REFUSE HOPPER

(71) Applicant: Cory A. Vaselaar, Sheldon, IA (US)

(72) Inventor: Cory A. Vaselaar, Sheldon, IA (US)

(73) Assignee: BROYHILL, INC., Dakota City, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/922,113

(22) Filed: Jul. 7, 2020

(51) Int. Cl.
*B65F 3/28* (2006.01)
*B65F 3/26* (2006.01)
*B65F 3/20* (2006.01)
*B60P 1/00* (2006.01)
*B30B 9/30* (2006.01)

(52) U.S. Cl.
CPC .............. *B65F 3/28* (2013.01); *B60P 1/006* (2013.01); *B65F 3/20* (2013.01); *B65F 3/26* (2013.01); *B30B 9/3046* (2013.01)

(58) Field of Classification Search
CPC .... B65F 3/20; B65F 3/208; B65F 3/26; B65F 3/28; B60P 1/006; B60P 1/04; B60P 1/16
USPC .......................................... 414/525.2, 525.5
See application file for complete search history.

(56) References Cited

U.S. PATENT DOCUMENTS

| | | | | |
|---|---|---|---|---|
| 3,554,398 A * | 1/1971 | Nickel | ................... | B60P 1/003 414/679 |
| 3,759,406 A * | 9/1973 | Nickel | ................... | B65F 3/208 414/525.5 |
| 3,966,096 A * | 6/1976 | Worthington | ............. | B65F 3/26 222/389 |
| 4,005,789 A * | 2/1977 | Gladwin | ................. | B65F 3/208 414/517 |
| 4,067,470 A * | 1/1978 | Felburn | ..................... | B65F 3/14 414/469 |
| 4,173,423 A * | 11/1979 | Pickrell | ................. | B60P 1/6454 414/404 |
| 4,210,407 A * | 7/1980 | Broyhill | .................... | B65F 3/00 414/407 |
| 6,149,371 A * | 11/2000 | De Vries | .................. | B65F 3/00 414/493 |
| 6,702,135 B2 * | 3/2004 | Pickier | ..................... | B60P 1/50 220/1.5 |
| 6,817,677 B1 * | 11/2004 | Beiler | ...................... | B60P 1/34 298/21 R |

(Continued)

FOREIGN PATENT DOCUMENTS

| | | | | |
|---|---|---|---|---|
| FR | 2683212 A1 * | 5/1993 | ............. | B65F 3/046 |
| GB | 2138386 A * | 10/1984 | ............. | B65F 3/206 |

*Primary Examiner* — James Keenan
(74) *Attorney, Agent, or Firm* — Dennis L. Thomte; Thomte Patent Law Office LLC

(57) ABSTRACT

A refuse hopper is disclosed which may be mounted in the bed of a pick-up truck, a flat-bed truck or on a trailer. The refuse hopper includes a horizontally disposed support frame having a rear end, a front end, a first side and a second side. A hopper is pivotally mounted on the support frame and has a front end, a rear end, a front side and a second side. The refuse hopper is selectively movable between a horizontally disposed loading position and a dumping position. A compactor plate is pivotally mounted to the hopper and is movable between an upwardly extending loading position to a refuse packing position within the hopper. The hopper has a volume of about four cubic yards.

6 Claims, 18 Drawing Sheets

(56) References Cited

U.S. PATENT DOCUMENTS

D781,936 S * 3/2017 Broyhill ................. B65F 3/208
　　　　　　　　　　　　　　　　　　　D15/123

* cited by examiner

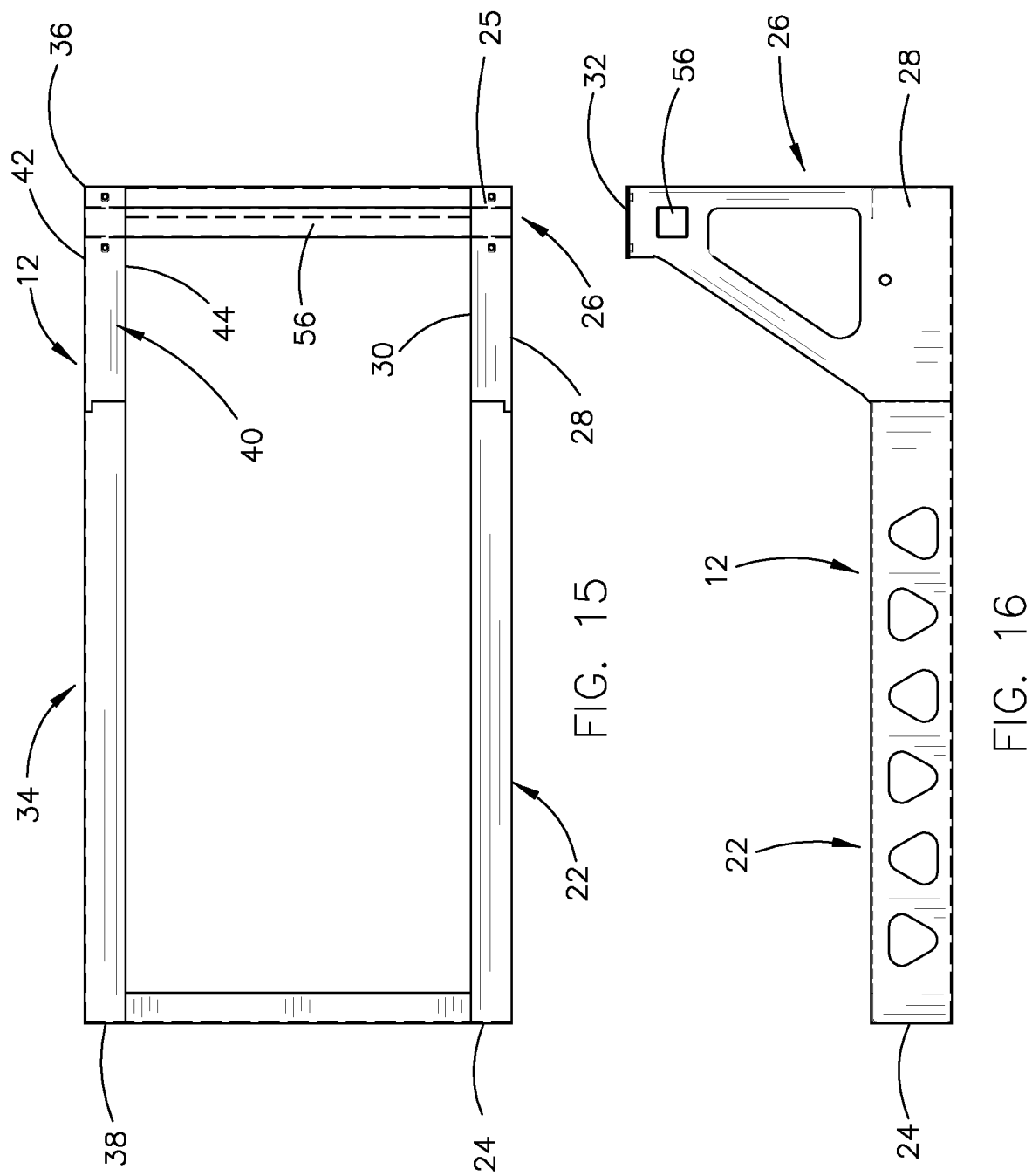

REFUSE HOPPER

BACKGROUND OF THE INVENTION

Field of the Invention

This invention relates to a refuse box or hopper for use with a flat-bed truck, a pick-up truck or trailer. More particularly, this invention relates to a refuse box or hopper which is capable of dumping the refuse therein into a larger dumpster or a packer truck. Even more particularly this invention relates to a refuse hauler which is smaller than other refuse haulers to that the refuse hauler of this invention is highly mobile and which is able to collect and compact refuse from locations wherein a large trash or refuse hauler could not reach.

Description of the Related Art

Many types of garbage or refuse trucks have been previously provided. In most cases, the refuse trucks of the prior art are very large and difficult to maneuver. Further, in many instances, the refuse to be picked up by the large trucks is minimal and hardly worth the time effort to collect the refuse from smaller sites.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A refuse box or hopper is disclosed which may be used with either a flat-bed truck, a pick-up truck or a trailer. The refuse box or hopper of this invention is capable of dumping the refuse therein into a larger dumpster or packer truck. The invention includes a horizontally disposed support frame having a front end, a rear end, a first side and a second side. The support frame is secured to the box of a pick-up truck or to the bed of a trailer. An upstanding first hopper support, having a lower end, an upper end, a front side and rear side, with its lower end secured to the support frame at the rear end thereof. A first bearing is mounted on the upper end of the first hopper support. An upstanding second hopper support, having a lower end, an upper end, a front side and a rear side, has its lower end secured to the support frame at the rear end thereof. The first and second hopper supports are spaced apart. A second bearing is mounted on the upper end of the second hopper support.

A refuse hopper is pivotally mounted on the support frame and has a volume of approximately 4.0 cubic yards. The refuse hopper includes a front wall, a first side wall, a second side wall, a rear wall and a bottom wall. The rear wall of the refuse hopper is in inclined and has a lower end, an upper end, an inner side, an outer side, a first side and a second side. The rear wall extends upwardly and rearwardly from the lower end thereof to the upper end thereof. The bottom wall of the hopper extends between the lower ends of the first side wall, the second side wall, the front wall and the rear wall.

The rear wall of the refuse hopper is pivotally secured to the first and second bearings on the upper ends of the first and second upper supports respectively. A first hydraulic cylinder, having a base end and a rod end, has its base end pivotally secured to the support frame and has its rod end pivotally secured to the rear wall of the refuse hopper. A second hydraulic cylinder, having a base end and a rod end, has its base end pivotally secured to the support frame and has its rod end pivotally secured to the rear wall. The extension of the first and second hydraulic cylinders cause the hopper to pivotally move from a loading position towards a dumping position.

A compactor plate is pivotally secured, about a transverse horizontally disposed axis, to the rear wall of the hopper. A third hydraulic cylinder, having a base end and a rod end, is movable between retracted and extended positions. The base end of the third hydraulic cylinder is operatively secured to the hopper. A linkage pivotally secures the rod end of the third hydraulic cylinder to the upper end of the compactor plate. The compactor plate is positioned between the first and second side walls when the third hydraulic cylinder is in the extended position. The compactor plate is in a horizontally disposed position when the third hydraulic cylinder is partially extended. The compactor plate is an upright position above the hopper when the third hydraulic cylinder is in the retracted position. The compactor plate functions as a wind screen when in a horizontally disposed position.

It is therefore a principal object of the invention to provide an improved refuse hopper.

A further object of the invention is to provide a refuse hopper having a capacity of approximately four cubic yards.

A further object of the invention is to provide a refuse hopper which may be mounted on a pick-up truck or a trailer.

A further object of the invention is to provide a refuse hopper having a smaller size than most refuse haulers.

A further object of the invention is to provide a refuse hopper which is economical of manufacture, durable in use and refined in appearance.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 15 is a top elevational view of a portion of the hopper support frame;

FIG. 16 is a side elevational view of the support frame of FIG. 15;

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 20:
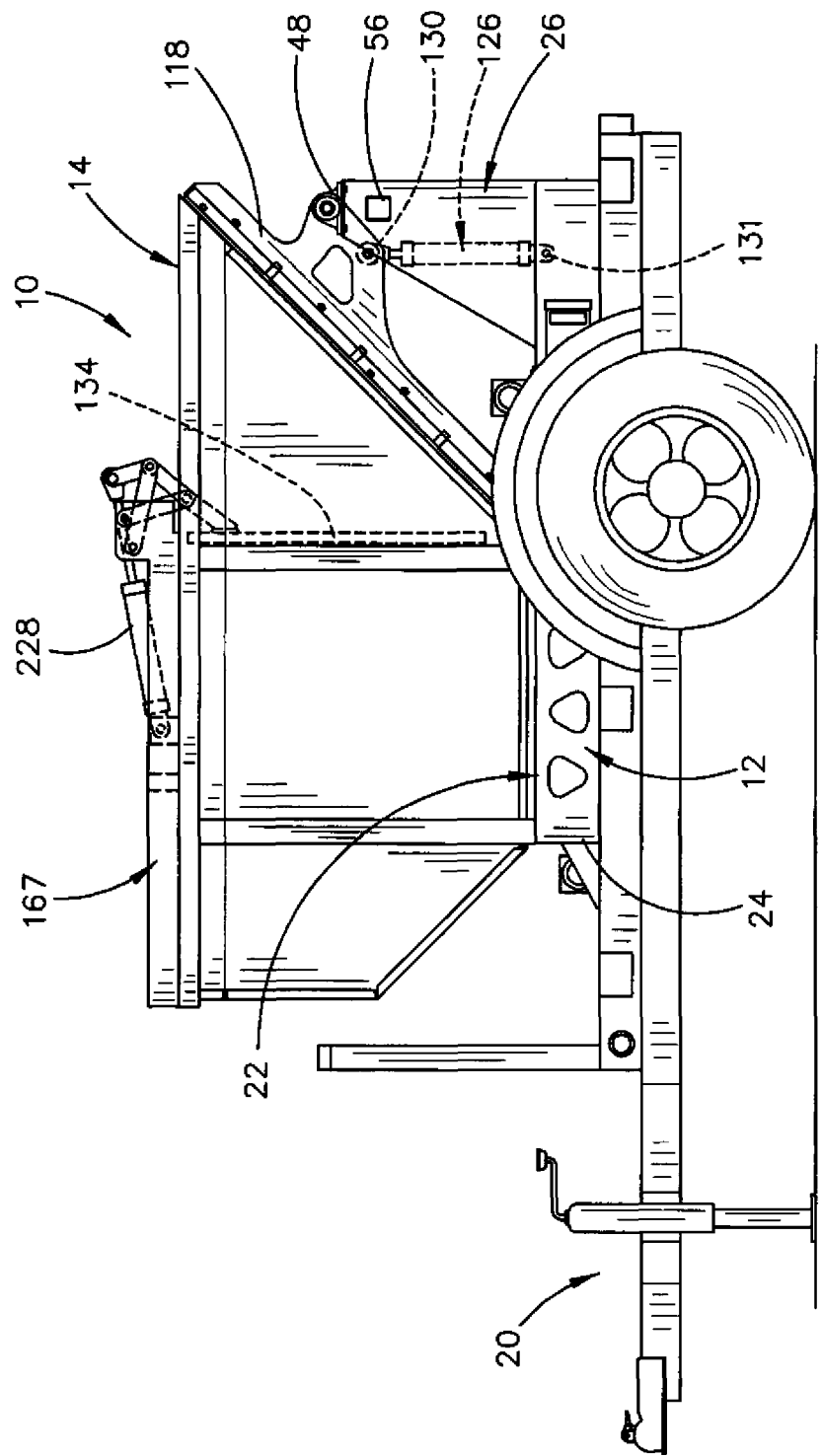
FIG. 20 is a partial side view of the refuse hopper of this invention mounted on a trailer.

The numeral 10 refers to the refuse hopper assembly of this invention which includes a horizontally disposed support frame 12 and a hopper 14 pivotally secured thereto which may be selectively movable between a loading and transport position and a dumping position as will be described in detail hereinafter. The refuse hopper assembly 10 is preferably mounted in the box 16 of a pick-up truck 18 or mounted on a trailer 20 as seen in FIG. 20. The refuse hopper assembly 10 could be mounted on a flat-bed truck.

Support frame 12 is horizontally disposed and includes an elongated first side frame member 22 having a front end 24 and a rear end 25. The numeral 26 refers to a vertically disposed frame upright or hopper support which is comprised of a pair of horizontally spaced-apart frame members or plates 28 and 30 which have their lower ends welded to the rear end of side frame member 22. The upper ends of frame members 28 and 30 have a bearing mount 32 secured thereto.

Support frame 12 also includes a second side frame member 34 having a rear end 36 and a front end 38. The numeral 40 refers to a vertically disposed frame upright or hopper support which is comprised of a pair of horizontally spaced-apart frame members or plates 42 and 44 which have their lower ends welded to the rear end of side frame member 34. The upper ends of frame members 42 and 44 have a bearing mount 46 secured thereto. Bearings 48 and 50 are secured to the bearing mounts 32 and 46 respectively.

A horizontally disposed cross-frame member 52 is secured to and extends between the front ends 24 and 38 of side frame members 22 and 24 respectively. A cross-frame member 54 is secured to and extends between the rear ends 25 and 36 of side frame members 22 and 24 respectively. A cross-tube 56 is secured to and extends between the frame uprights 26 and 40 below the upper ends thereof as seen in the drawings.

Hopper 14 includes a front wall 58, a rear wall 60, a first side wall 62, a second side wall 64 and a bottom wall 66, all of which will be described in more detail hereinafter. Front wall 58 includes a vertically disposed upper wall portion 68 having an upper end 70 and a lower end 72 Front wall 58 also includes an inclined lower wall portion 74 which extends downwardly and rearwardly from the lower end 72 of upper wall portion 68. The lower wall portion 74 has side edges 76 and 78 and a horizontally disposed bottom edge 79.

Rear wall 60 includes an upper end 80 and a lower end 82. As seen, rear wall 60 extends downwardly and forwardly from its upper end 80 to its lower end 82. Rear wall 60 also includes side edges 84 and 86.

Side wall 62 includes an upper end 88, a lower end 90, a front end 92 and a rear end 94. Side wall 62 has a vertically disposed wall portion 96 at its upper end 88. Side wall 62 includes an inclined wall portion 98. Side wall portion 98 extends downwardly and inwardly from the lower end of wall portion 96 to the lower end 90 thereof. Side wall 62 includes an inclined wall portion 100 which extends from the lower end of front end 92. The front end 92 of side wall 62 conforms to the side edge 76 of front wall 58 and is welded thereto. The rear end 94 of side wall 62 conforms to the side edge 84 of rear wall 60 and is welded thereto.

Side wall 64 includes an upper end 102, a lower end 104, a front end 106, and a rear end 108. Side wall 64 has a vertically disposed wall portion 110 at its upper end 102. Side wall 64 extends downwardly and inwardly from the lower end of wall portion 110 to lower end 104 thereof. The front end 106 of side wall 64 conforms to the side edge 78 of front wall 58 and is welded thereto. The rearward end 108 of side wall 64 conforms to the side edge 86 of rear wall 60 and is welded thereto. Bottom wall 66 is welded to the lower ends of front wall 58, side walls 62 and 64 and rear wall 60.

A brace or frame member 112 is welded to the upper ends of front wall 58, side wall 62 and side wall 64. Various braces 114 are welded to the exterior of hopper 14 to strengthen the hopper 14.

A plurality of horizontally disposed and vertically spaced-apart support members 116 are secured to the outer side of rear wall 60 by bolts 117 or the like. A pair of horizontally spaced-apart and identical pivot plates 118 are secured to the support members 116 by welding. Each of the plates 118 have notches 119 formed therein which receive the support members 116 therein. Each of the plates 118 has a rearwardly extending portion 120 which has an upper pin opening 122 and a lower pin opening 124 formed therein. The plates 118 are positioned so that the openings 122 in plates 118 may receive the ends of a pin or shaft 124 therein which extends through the bearing 48 which is secured to the bearing mount 32.

The numeral 126 refers to a hydraulic cylinder which is positioned between the plates 28 and 30 of frame upright 26. The rod end 128 of cylinder 126 is pivotally connected to the plates 118 by a pivot pin 130 which is received in the openings 124 of plates 118. The base end of cylinder 126 is pivotally connected to the frame upright 26 by a pivot pin 131.

A second pair of pivot plates 118' are secured to the support members 116 at the other side of rear wall 60. The second pair of pivot plates 118' are pivotally secured to the bearing 50 mounted on bearing mount 46. A hydraulic cylinder 132 has its base end pivotally secured to frame upright 40 by a pivot pin 133. The rod end of hydraulic cylinder 132 is pivotally connected to the openings 124' of plates 118'.

Figure 4:
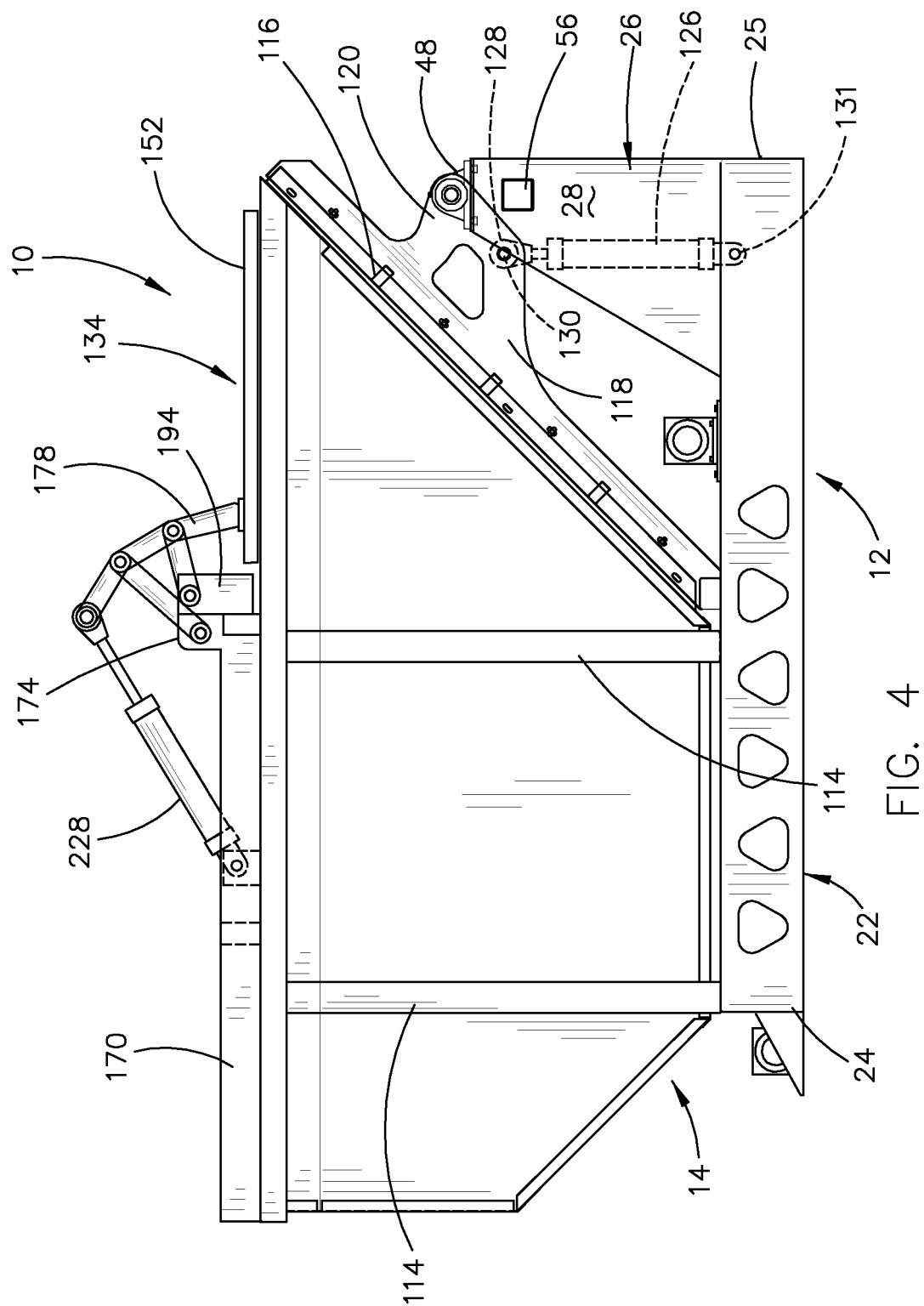
FIG. 4 is a side elevational view of the refuse hopper of this invention in its transport position with the compactor plate of this invention being in its horizontal wind screen position.
Figure 5:
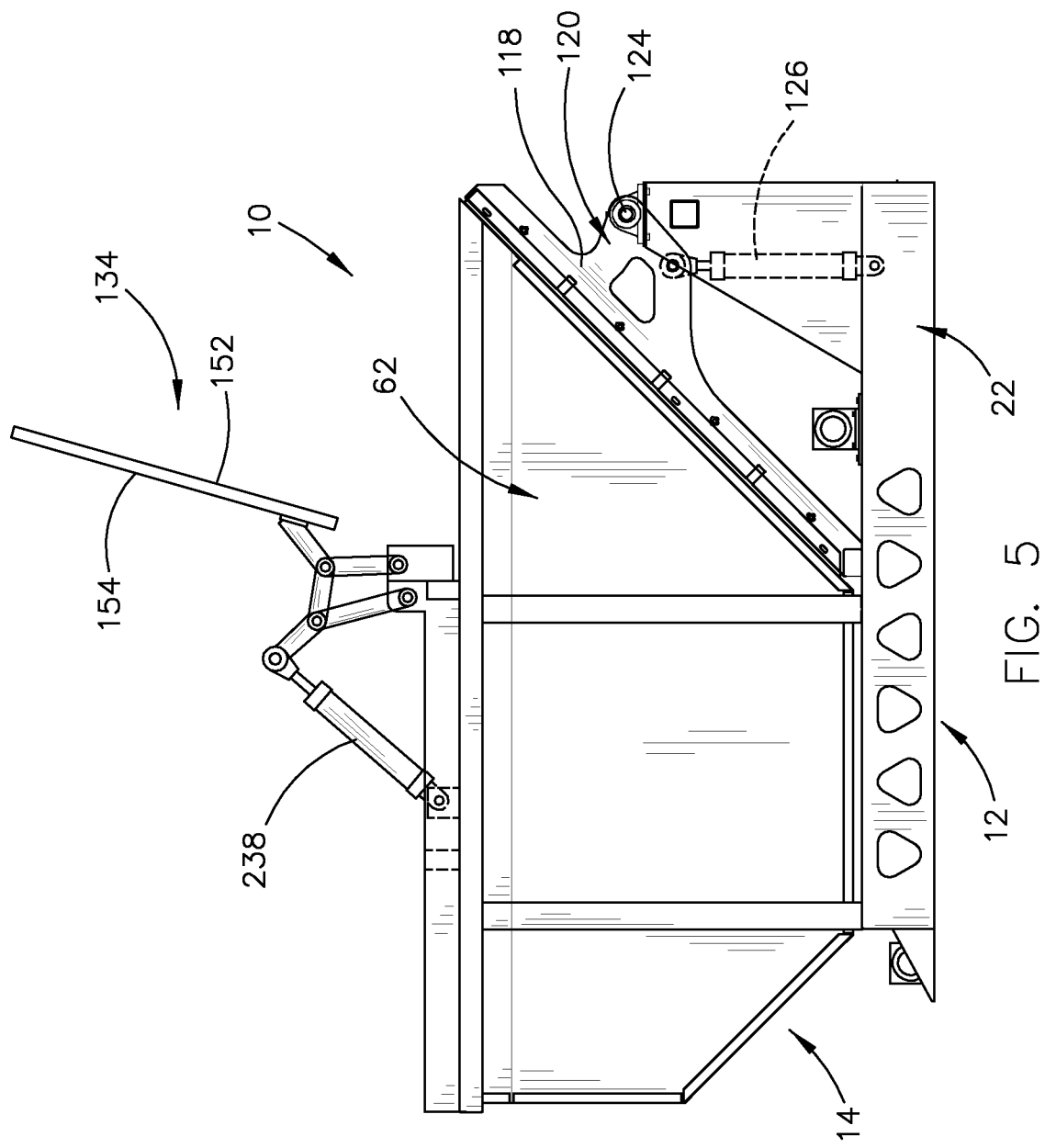
FIG. 5 is a side view similar to FIG. 4 except that the compactor plate of this invention is in its hopper fill position.
Figure 6:
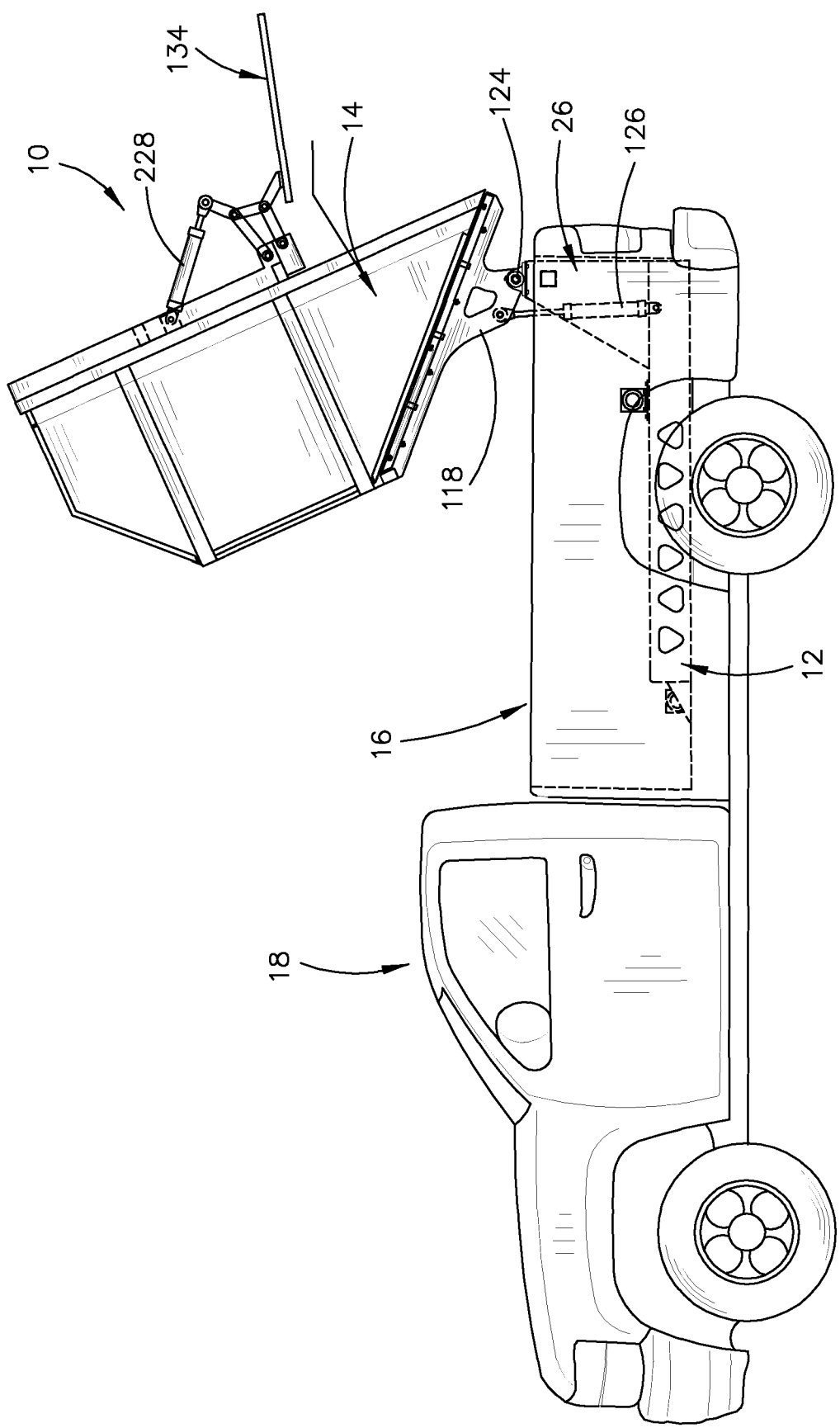
FIG. 6 is a side elevational view similar to FIG. 1 except that the refuse hopper is in its dumping position.
Figure 7:
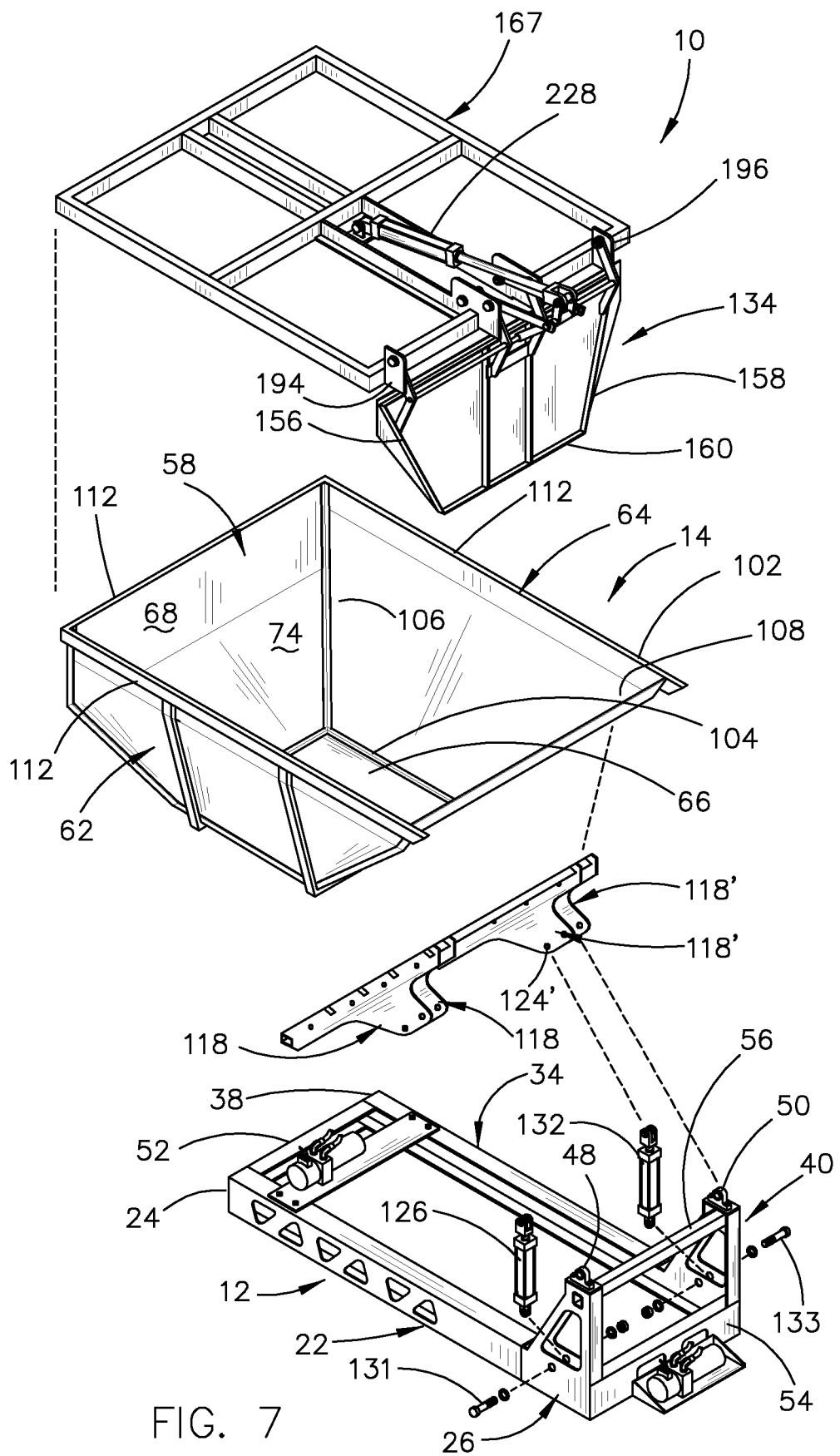
FIG. 7 is an exploded perspective view of the refuse hopper of this invention.

When the hydraulic cylinders 126 and 132 are in the retracted position, hopper 14 will be positioned on the support frame 12 in a loading or transport position (FIG. 4). When the hydraulic cylinders 126 and 132 are extended, hopper 14 will be moved to the dumping position of FIG. 6.

The numeral 134 refers to a metal compactor plate. Compactor plate 134 includes an upper end 136 having ends 138 and 140. Compactor plate 134 has a side edge 142 which extends downwardly from end 138 thereof and a side edge 144 which extends downwardly from end 140 thereof. An inclined side edge 146 extends downwardly and inwardly from the lower end of side edge 142. An inclined side edge 148 extends downwardly and inwardly from side edge 144. The lower end 150 of compactor plate 134 extends between the lower ends of side edges 146 and 148.

Compactor plate 134 will be described as having an inner side 152 and an outer side 154. The outer side 154 of compactor plate 134 has an elongated reinforcing bar 156 welded thereto at the side edges 142 and 146 and has an elongated reinforcing bar 158 welded thereto at the side edges 144 and 148. The outer side 154 of compactor plate 134 has an elongated reinforcing bar 160 welded thereto at lower end 150 thereof. The outer side 154 of compactor plate 134 also has elongated reinforcing bars 162 and 164 welded thereto. A plate 165 is welded to bars 162 and 164 at the upper ends thereof. An elongated and horizontally disposed frame member 166 extends laterally from frame 167, which will be described in detail hereinafter, above the compactor plate 134. An elongated and horizontally disposed frame member 168 extends laterally from frame 167 above compactor plate 134. The inner ends of frame members 166 and 168 are spaced-apart. Frame 167 includes a pair of spaced-apart and horizontally disposed frame members 170 and 172 having vertically disposed plate portions 174 and 175 at the rearward ends thereof respectively.

Figure 8:
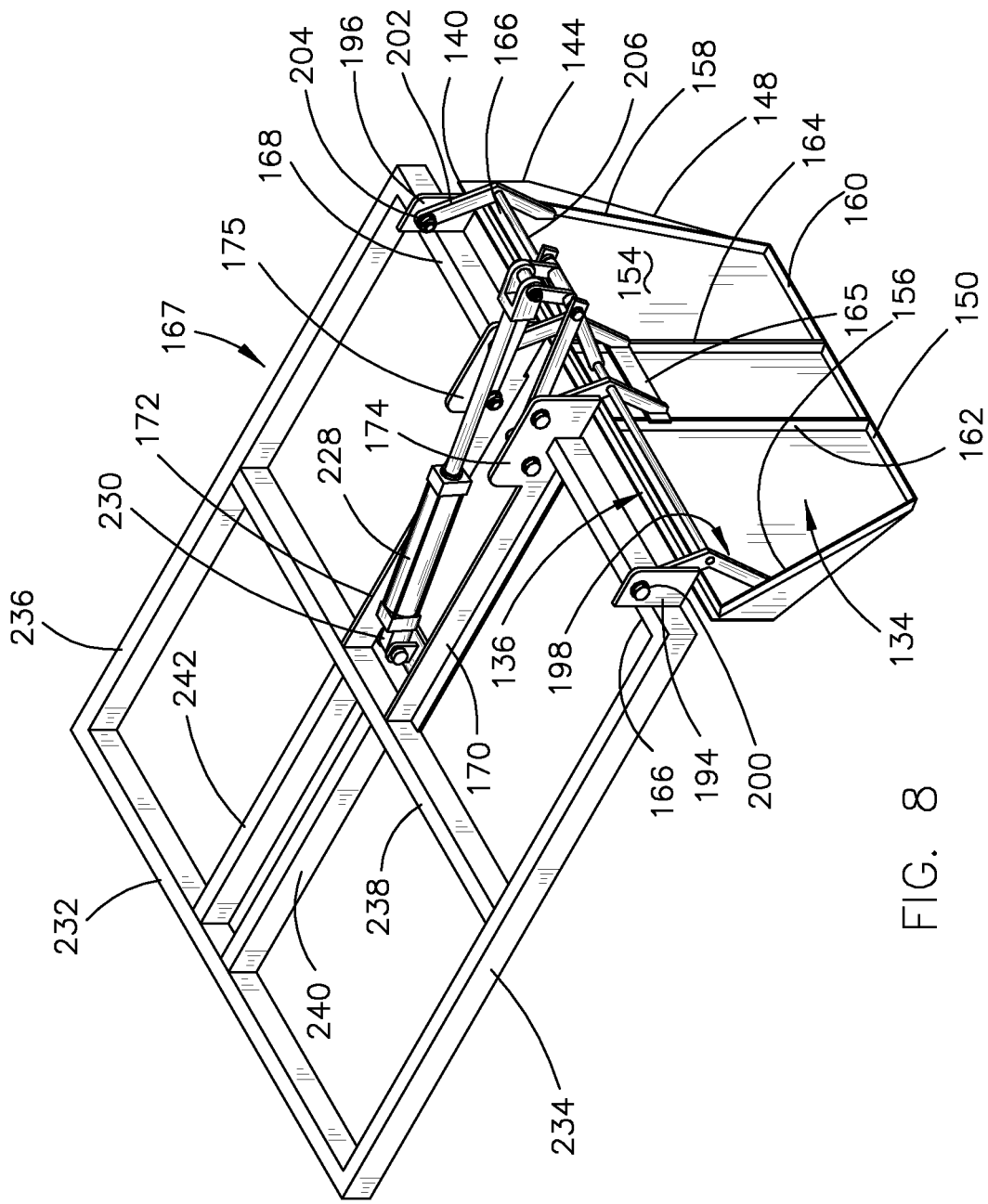
FIG. 8 is a partial perspective view illustrating the support structure for the compactor plate of this invention.
Figure 9:
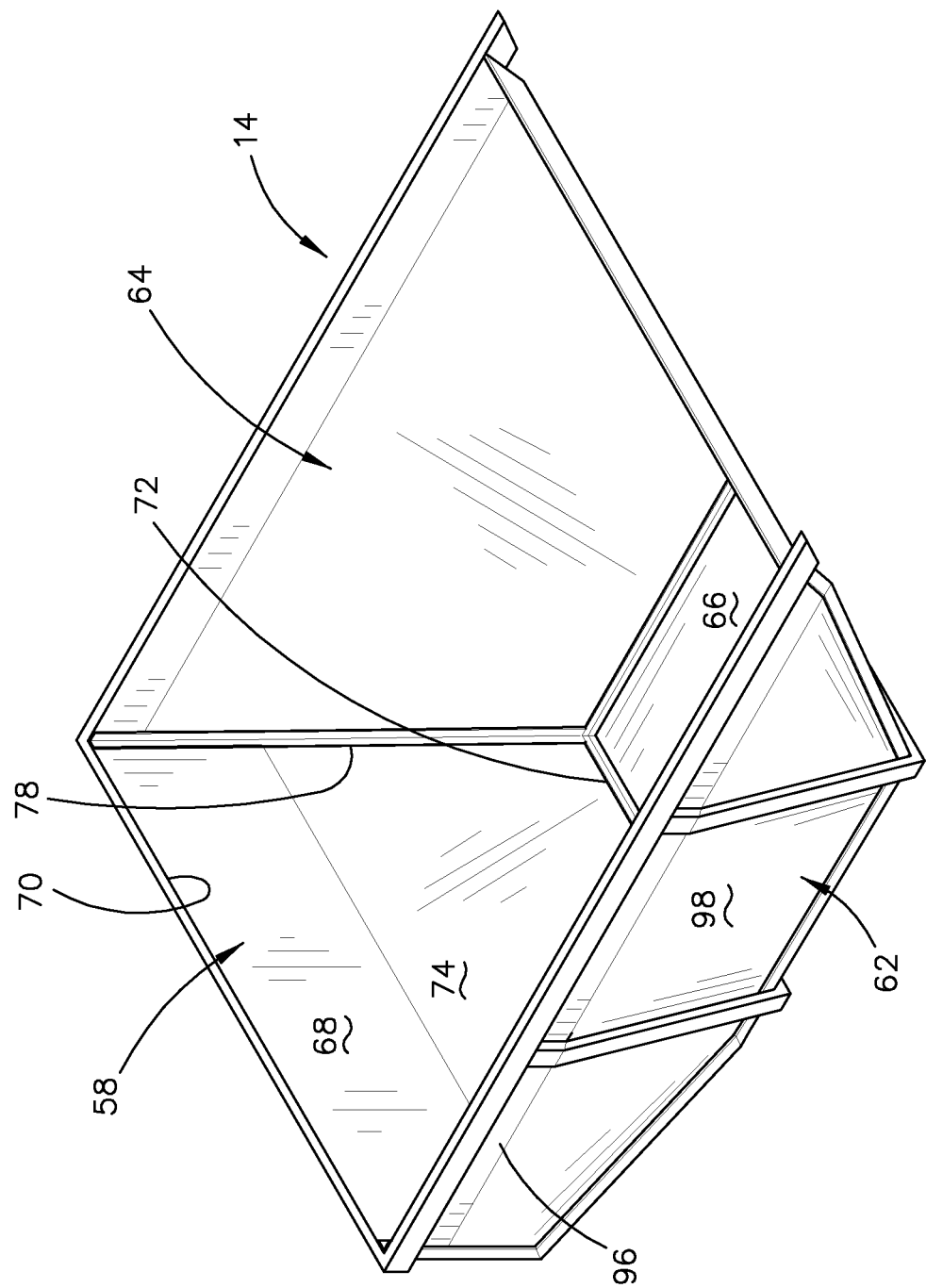
FIG. 9 is a perspective view of the hopper portion of the refuse hopper of this invention.
Figure 10:
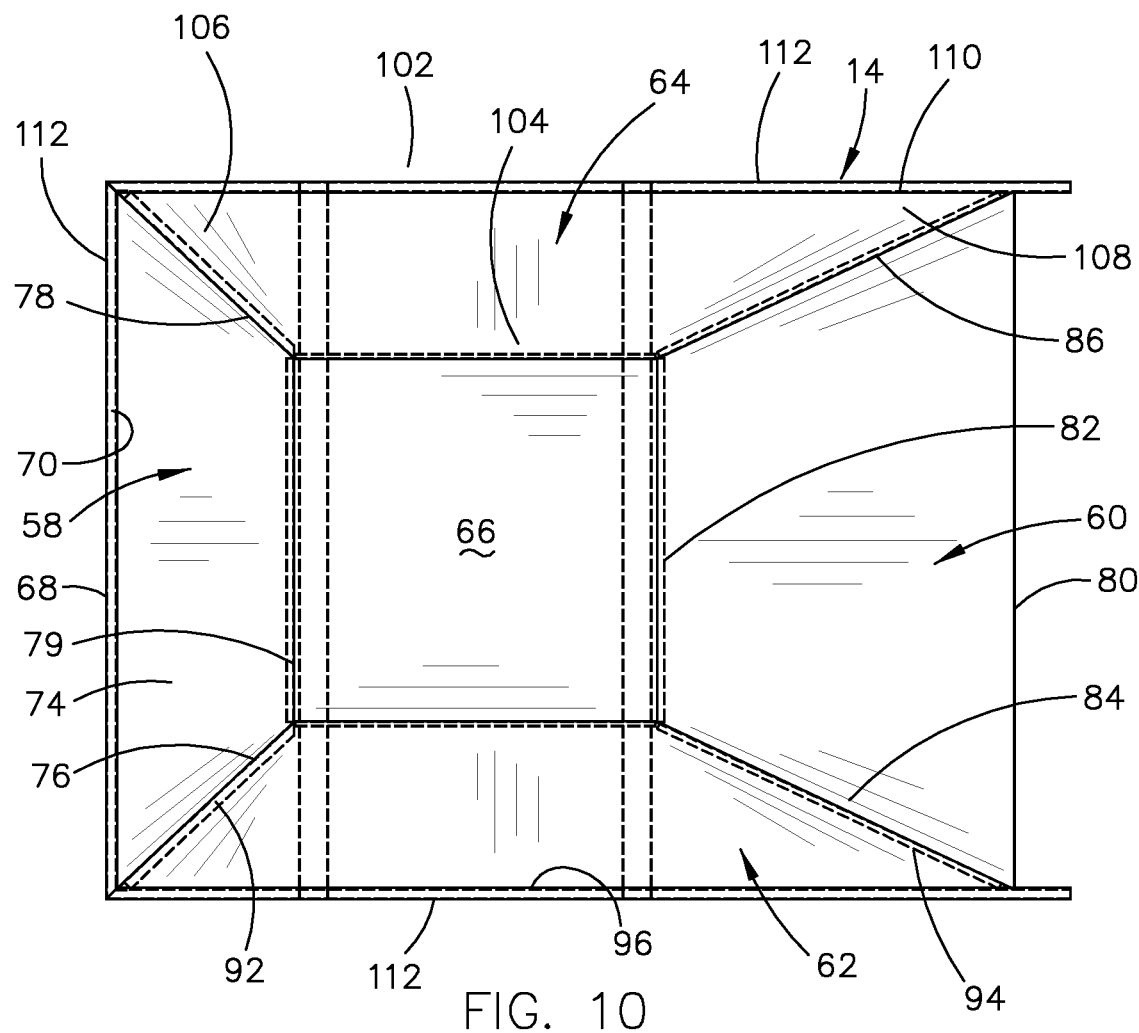
FIG. 10 is a top elevational view of the hopper portion of the refuse hopper of this invention.
Figure 11:
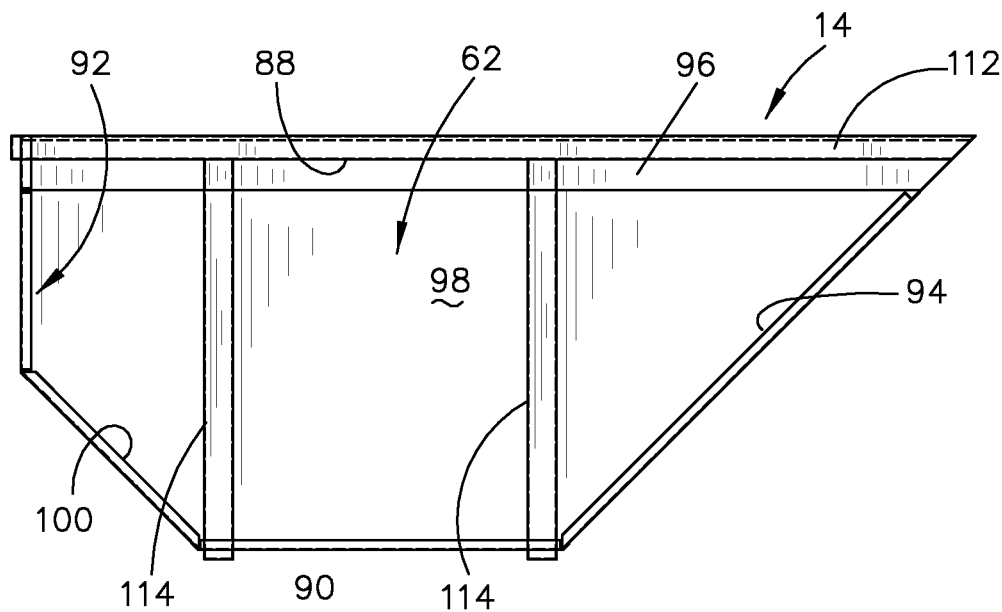
FIG. 11 is a typical side elevational view of the hopper portion of the refuse hopper of this invention.
Figure 12:
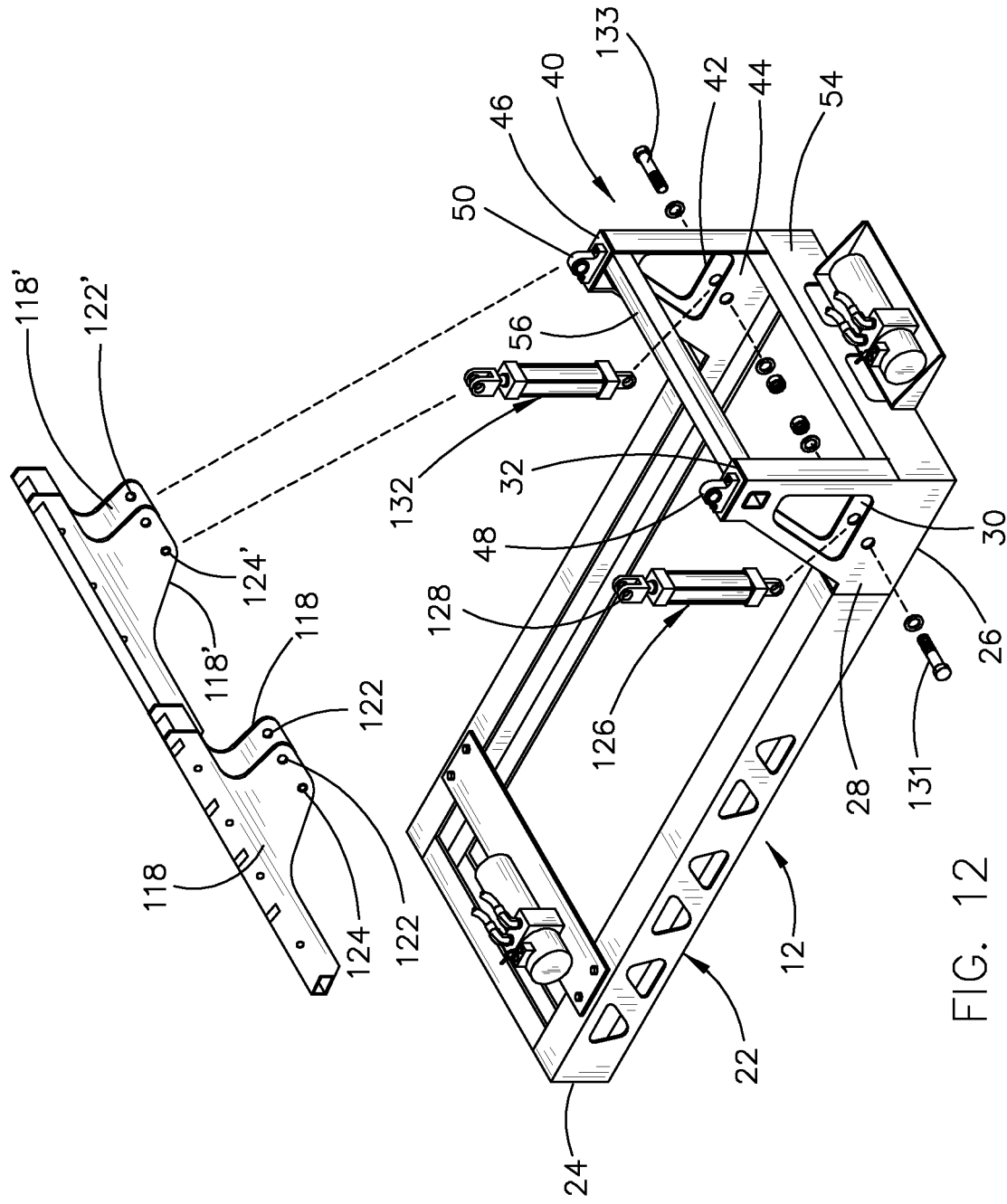
FIG. 12 is a partial exploded perspective view of support structure for the hopper portion of the refuse hopper of this invention.
Figure 14:
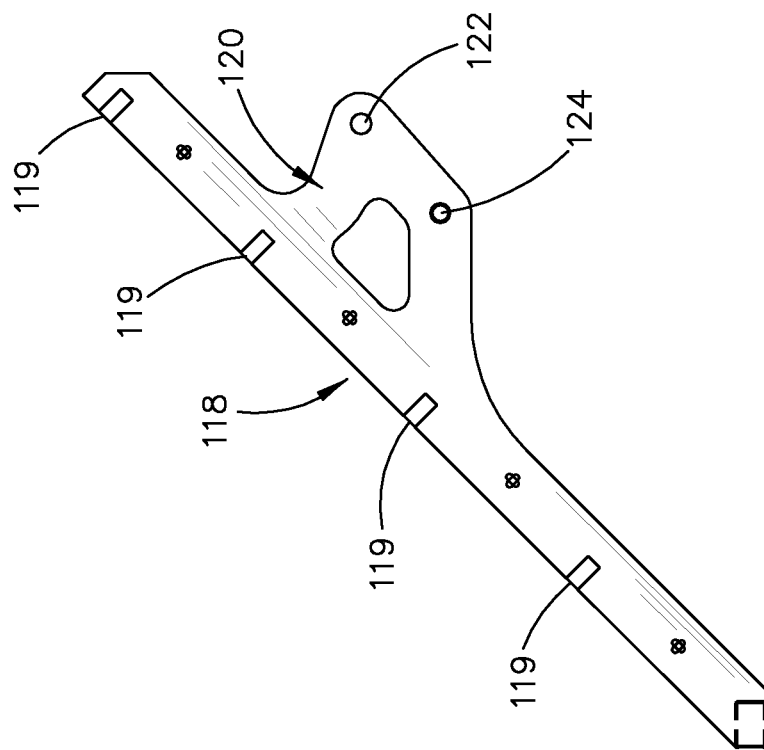
FIG. 14 is a side view of a portion of the pivot support structure of the refuse hopper of this invention.
Figure 13:
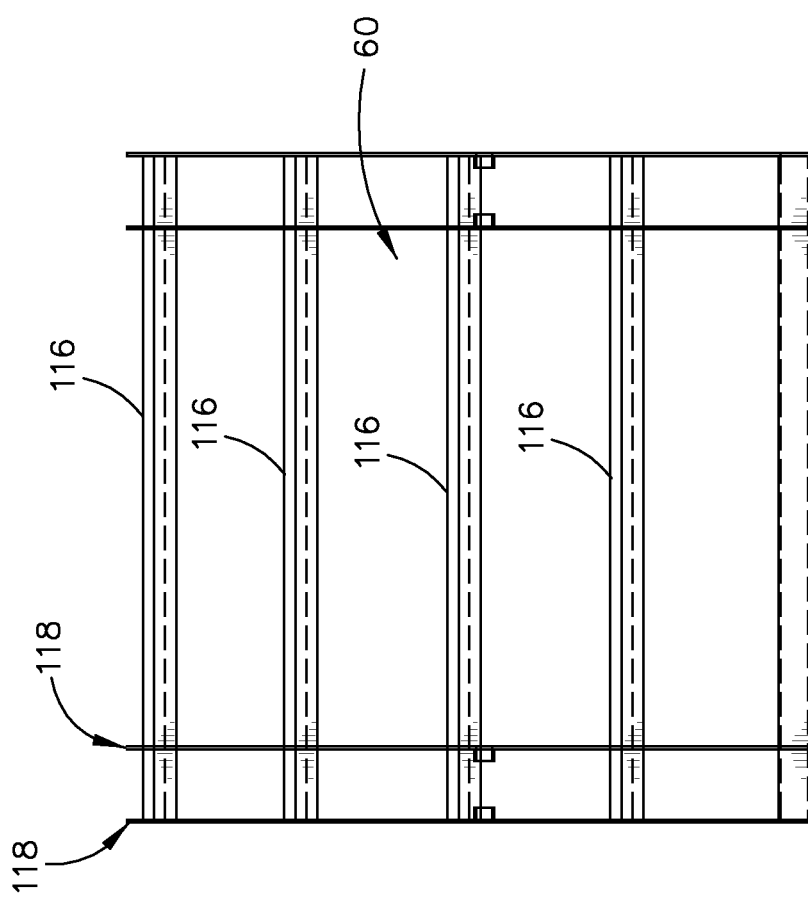
FIG. 13 is a rear elevational view of the hopper portion of this invention.
Figure 17:
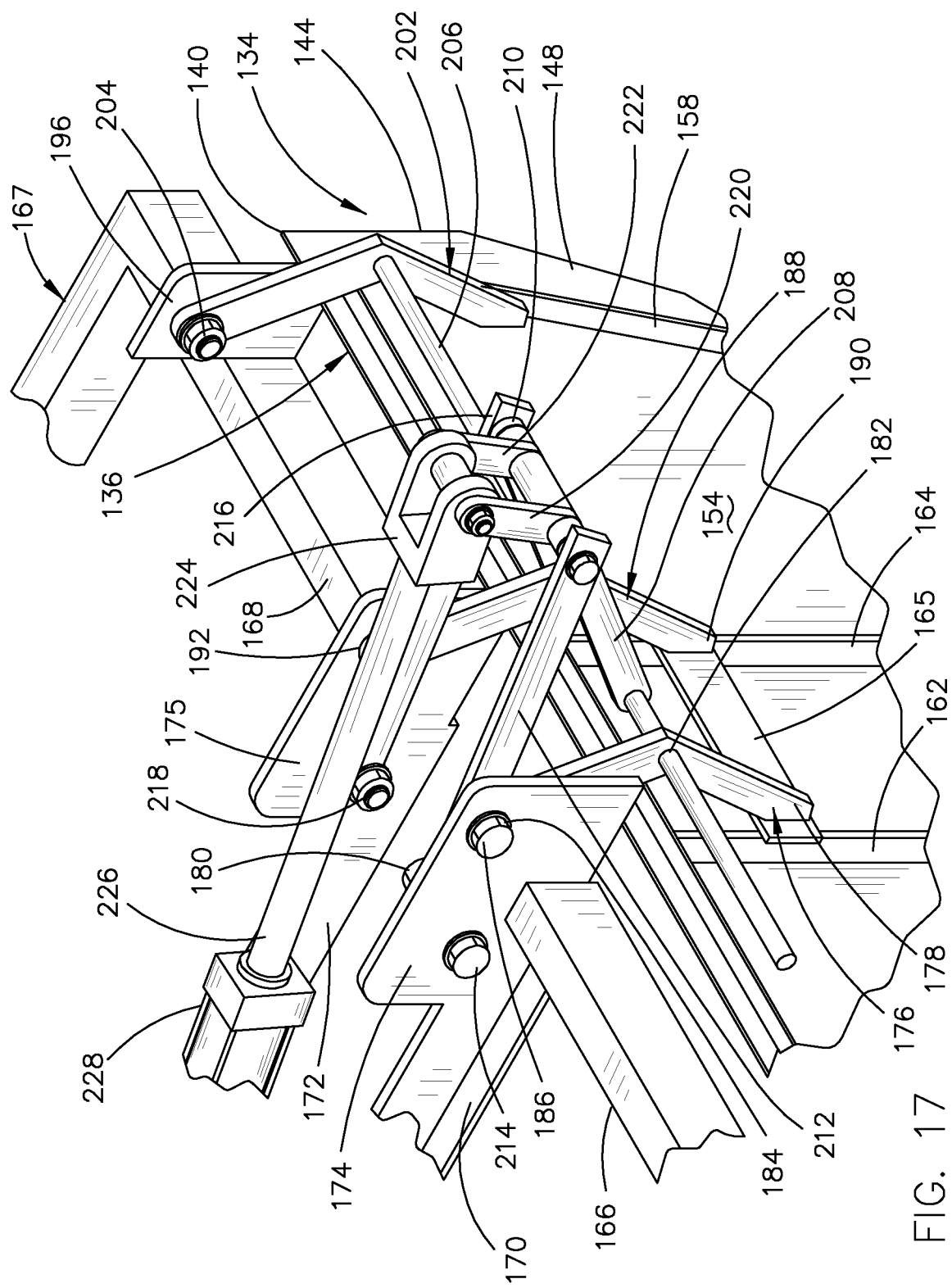
FIG. 17 is a partial perspective view of the compactor plate support and the means for pivotally moving the compactor plate.
Figure 18:
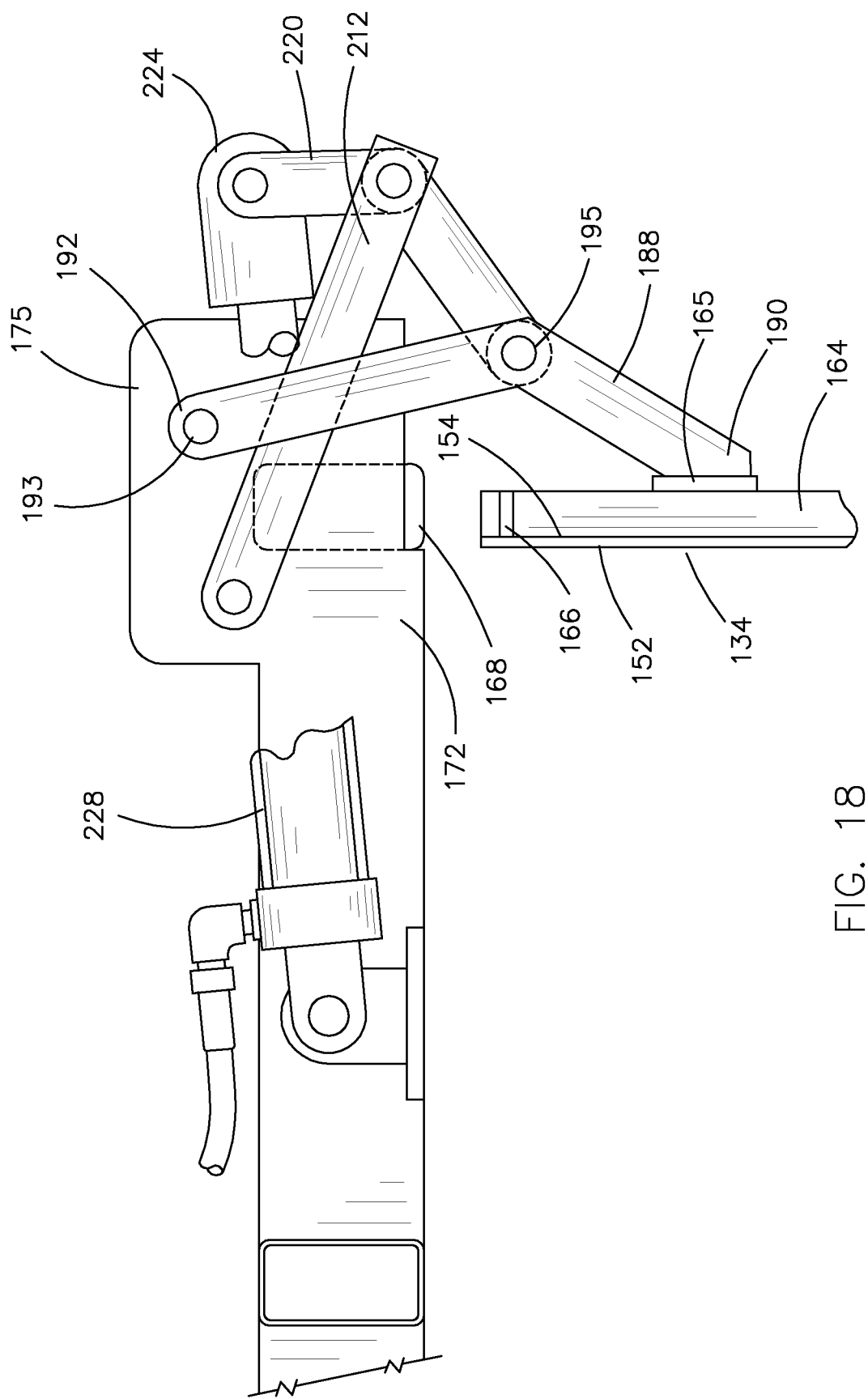
FIG. 18 is a partial side elevational view of the structure of FIG. 17.
Figure 19:
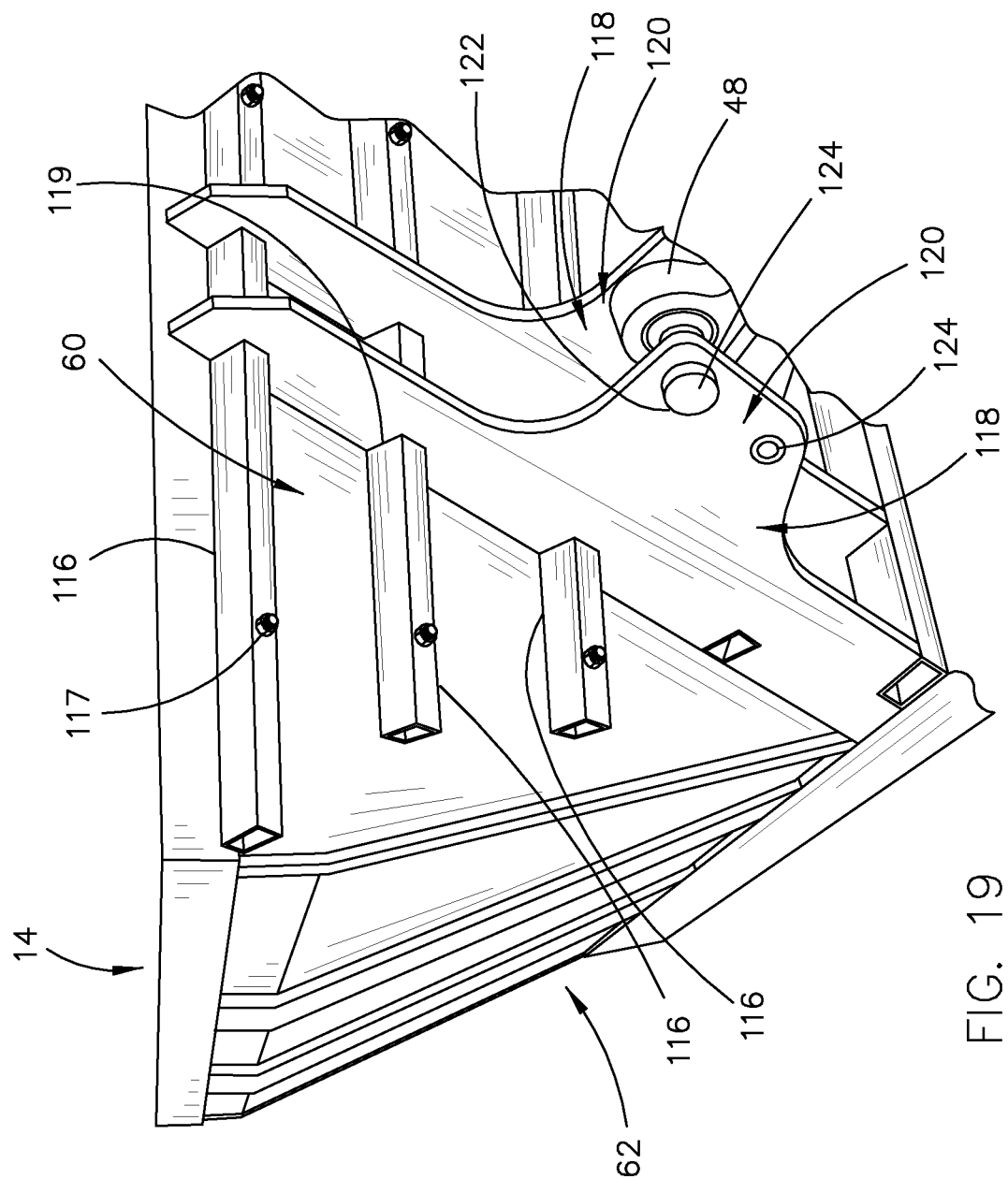
FIG. 19 is a partial rear perspective view of the rear end of the hopper and some of the pivot support structure thereof.

The numeral 176 refers to an angled support having ends 178 and 180. End 178 of support 176 is welded to plate 165. The apex of support 176 has an opening 182 formed therein. End 180 of support 176 is pivotally secured to plate portion 174 at 184 by a pivot pin 186. The numeral 188 refers to an angled support having ends 190 and 192. The end 190 of support 188 is welded to plate 165. The apex of support 188 has an opening 195 formed therein which is aligned with opening 182 of support 176. End 192 of support 188 is pivotally secured to plate portion 175 by a pivot pin 193. As seen in FIG. 8, plate 194 is welded to frame member 166 and a plate 196 is welded to frame member 168.

The numeral 198 refers to an angled support which has its upper end pivotally secured to plate 194 by a pivot bolt 200. The lower end of support 198 is welded to reinforcing bar 156. The numeral 202 refers to an angled support which has its upper end pivotally secured to plate 196 by pivot bolt 204. The lower end of support 202 is welded to reinforcing bar 158. The numeral 206 refers to an elongated and horizontally disposed pivot rod. One end of pivot rod 206 is secured to angled support 198 at the apex thereof. Rod 206 extends through opening 182 in support 176 and through opening 195 in support 188. The end of rod 206 is secured to support 202 at the apex thereof.

Elongated and horizontally spaced-apart links 208 and 210 have one end thereof rotatably receiving pivot rod 206 between supports 176 and 188. An elongated link 212 has its rearward end pivotally secured to links 208 and 210 and has its forward end pivotally secured to plate portion 174 by a pivot bolt 214. An elongated link 216 has its rearward end pivotally secured to links 208 and 210. The forward end of link 216 is pivotally secured to plate portion 175 by a pivot bolt 218. Links 220 and 222 are pivotally secured to links 208 and 210 and extend therefrom. The other ends of links 220 and 222 are pivotally secured to a clevis 224 which is secured to the cylinder rod 226 of hydraulic cylinder 228. The base end of hydraulic cylinder 228 is pivotally secured to forward ends of frame members 170 and 172 at 230.

The frame 167 includes a front frame member 232, side frame member 234 and 236, cross-frame member 238 and short frame members 240 and 242. The frame member 232 of frame 167 is positioned on and secured to the frame member 112 on the upper end of front wall 56. Frame member 234 of frame 167 is positioned on and secured to the frame member 112 on the upper end of the side wall 62. Frame member 236 of frame 167 is positioned on and secured to the frame member 112 on the upper end of side wall 64. A roof or top wall, not shown, is usually positioned on and secured to the frame members 232, 234 and 236 and extends thereover except for the area wherein the hydraulic cylinder 228 is located.

Figure 21:
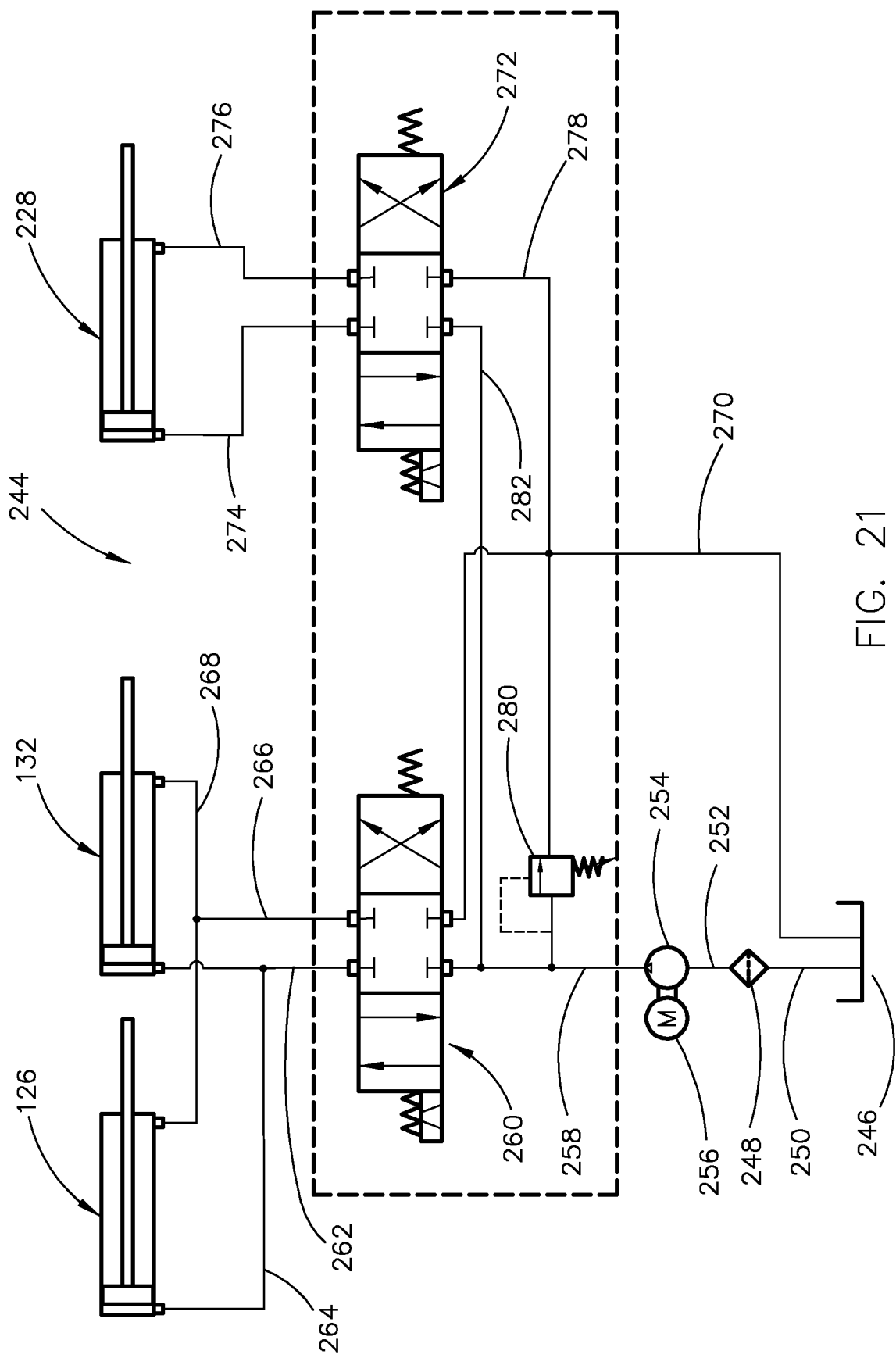
FIG. 21 is a schematic of the hydraulic system of this invention and the controls thereof.

FIG. 21 illustrates the hydraulic system 244 of this invention. System 244 includes a hydraulic fluid reservoir 246 which is fluidly connected to a strainer 248 by line 250. Line 252 fluidly connects strainer 248 to an electrically driven pump 254 which is driven by a 12-volt motor 256. The numeral 260 refers to a solenoid operated directional control assembly. Fluid line 262 extends from assembly 260 to one end of hydraulic cylinder 132. Fluid line 264 extends from line 262 to one end of hydraulic cylinder 126. Line 270 extends from assembly 260 to reservoir 246.

Figure 1:
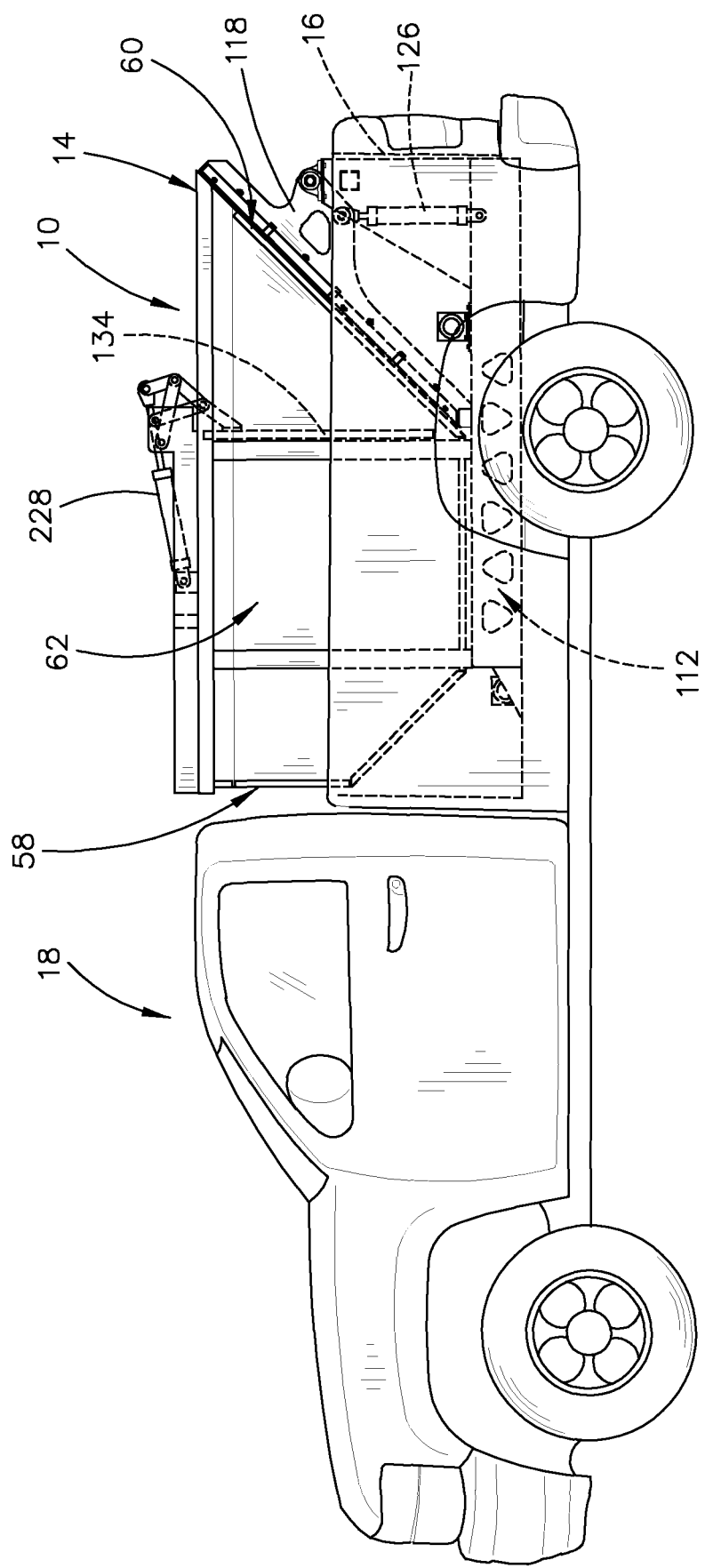
FIG. 1 is a side elevational view of the refuse hopper of this invention mounted in the box of a pick-up truck.
Figure 2:
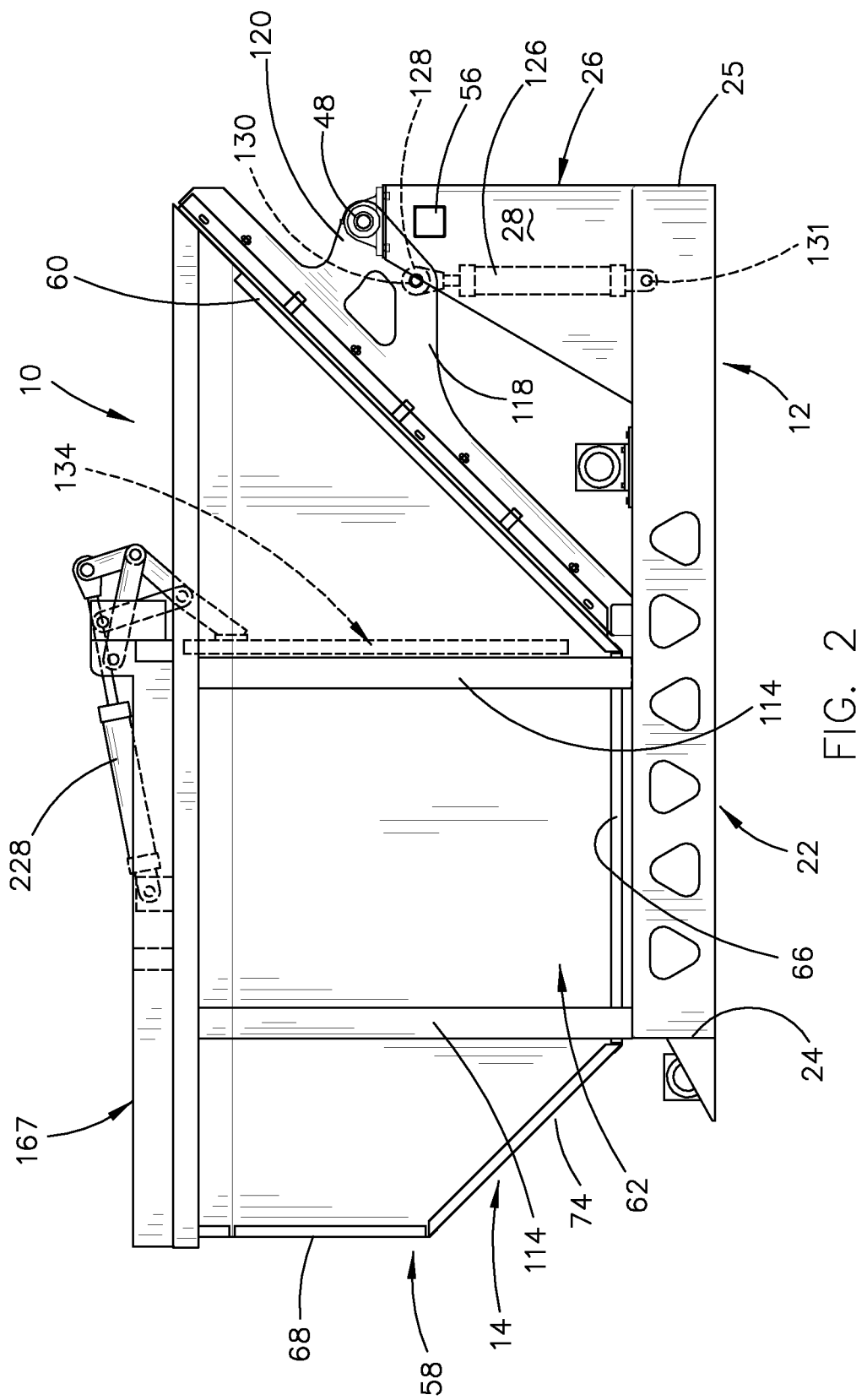
FIG. 2 is a first side elevational view of the refuse hopper of this invention with the refuse hopper being in a non-dumping position with the compactor plate of this invention in a vertically disposed position.
Figure 3:
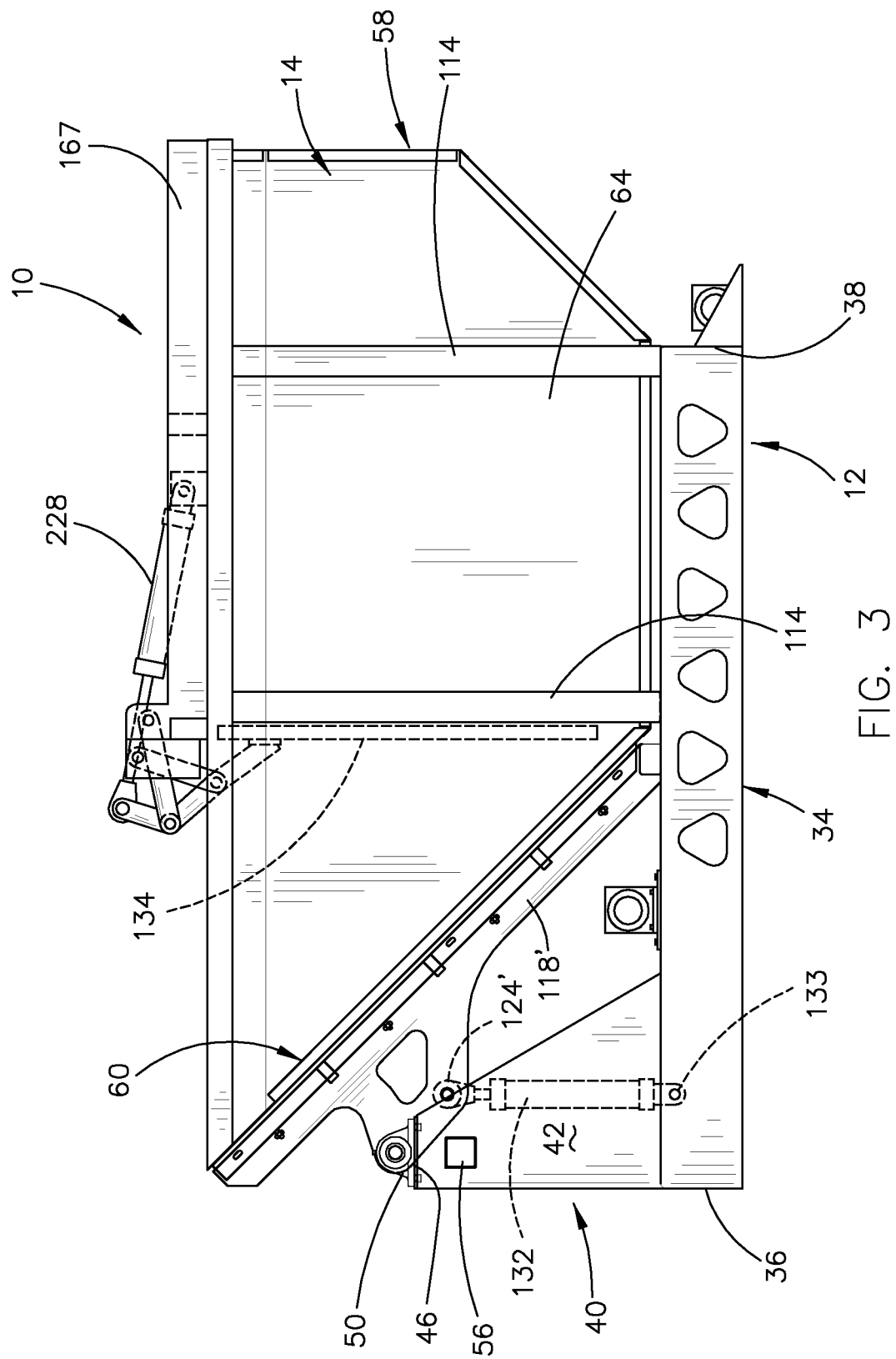
FIG. 3 is a second side elevational view of the refuse hopper of this invention with the refuse hopper being in a non-dumping position with the compactor plate of this invention in a vertically disposed position.

Assuming that the cylinders 126 and 132 are in the retracted position of FIG. 21, the cylinders 126 and 132 will be filled with hydraulic fluid outwardly of the pistons thereof. When the cylinders are in the retracted position, the hopper 14 will be in the lower loading and transport position when it is desired to pivot the hopper 14 from the loading and transport position of FIG. 1 to the dumping position of FIG. 6, the assembly 260 will be operated to supply hydraulic fluid to the inner end of cylinder 126 by way of lines 262 and 264 and to supply hydraulic fluid to the inner end of cylinder 132 by way of line 262 to extend the cylinders 126 and 132. During the extension of cylinders 126 and 132, hydraulic fluid in the cylinders outwardly of the pistons thereof will be exhausted to the assembly 260 by way of lines 268 and 266 and then supplied to reservoir 246 by way of line 270. When it is desired to pivot the hopper 14 from its dumping position to its loading and transport position, assembly 260 will be operated to supply hydraulic fluid to the outer ends of cylinders 126 and 132 by way of the lines 266 and 268. At that time, the hydraulic fluid in the cylinders 126 and 132 inwardly of the pistons thereof will be supplied to assembly 260 by way of the lines 264 and 262 and then returned to reservoir 246 by line 270.

The numeral 272 refers to a solenoid operated directional control valve assembly. Assembly 272 is connected to the inner end of hydraulic cylinder 228 by fluid line 274. Assembly 272 is fluidly connected to the outer end of hydraulic cylinder 228 by line 276. Assembly 272 is fluidly connected to line 258 by line 278. A pressure relief valve 280 is imposed in line 278. Hydraulic fluid is supplied to hydraulic cylinder 228 by line 274 to cause hydraulic cylinder 228 to extend. When hydraulic fluid is supplied to hydraulic fluid by way of line 276, hydraulic cylinder 228 will retract.

The components within the dashed lines are part of the 12-volt motor pump 256. All valves are controlled by momentary switches.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A refuse hopper for installation on a truck having a bed with a rear end, a front end, a first side and a second side, comprising:
   a horizontally disposed support frame having a front end, a rear end, a first side and a second side;
   said support frame being secured to the bed of the truck;
   said support frame including:
   (a) a horizontally disposed front frame member having a first end and a second end;
   (b) a horizontally disposed rear frame member having a first end and a second end;
   (c) a horizontally disposed first side frame member having a front end and a rear end;
   (d) said front end of said first side frame member being secured to said first end of front frame member;
   (e) said rear end of said first side frame member being secured to said first end of said rear frame member;
   (f) a horizontally disposed second side frame member having a front end and a rear end;
   (g) said front end of said second side frame member being secured to said second end of said front frame member;
   (h) said rear end of said second side frame member being secured to said second end of said rear frame member;
   (i) an upstanding first hopper support having a lower end, an upper end, a front side and a rear side;
   (j) said lower end of said first hopper support being secured to said first side frame member at said rear end thereof;
   (k) a first bearing support mounted on said upper end of said first hopper support;
   (l) a first bearing mounted on said first bearing support;
   (m) an upstanding second hopper support having a lower end, an upper end, a front side and a rear side;
   (n) said lower end of said second hopper support being secured to said second side frame member at said rear end thereof;
   (o) a second bearing support mounted on said upper end of said second hopper support; and
   (p) a second bearing mounted on said second bearing support;
   a refuse hopper pivotally mounted on said support frame;
   said refuse hopper being selectively movable between loading and rearward dumping positions;
   said refuse hopper including a front wall, a first side wall, a second side wall, a rear wall and a bottom wall;
   said front wall of said refuse hopper including:
   (a) a vertically disposed upper wall section having an upper end, a first side and a second side;
   (b) an inclined lower wall section having an upper end, a lower end, a first side and a second side;
   (c) said upper end of said inclined lower wall section being secured to said lower end of said upper wall section;
   (d) said inclined lower wall section extending downwardly and rearwardly from said lower end of said upper wall section;
   said rear wall of said refuse hopper being inclined and having a lower end, an upper end, an inner side, an outer side, a first side and a second side;
   said rear wall of said refuse hopper extending upwardly and rearwardly from said lower end thereof to said upper end thereof;
   said first side wall of said refuse hopper including:
   (a) an inclined side wall portion having a lower end, an upper end, a forward end, a rearward end, an inner side and an outer side;
   (b) a vertically disposed upper side wall portion having a lower end, an upper end, a forward end, a rearward end, an inner side and an outer side;
   (c) said lower end of said upper side wall portion of said first side wall of said refuse hopper being secured to said upper end of said lower side wall portion of said first side wall of said refuse hopper and extending upwardly therefrom;
   (d) said rearward end of said lower side wall portion of said first side wall of said refuse hopper being secured to said first side of said rear wall of said refuse hopper;
   (e) said forward end of said lower side wall portion of said first side wall of said refuse hopper being secured to said first side of said front wall of said refuse hopper;
   said second side wall of said refuse hopper including:
   (a) an inclined side wall portion having a lower end, an upper end, a forward end, a rearward end, an inner side and an outer side;
   (b) a vertically disposed upper side wall portion having a lower end, an upper end, a forward end, a rearward end, an inner side and an outer side;
   (c) said lower end of said upper side wall portion of said second side wall of said refuse hopper being secured to said upper end of said inclined side wall portion of said second side wall of said refuse hopper and extending upwardly therefrom;
   (d) said rearward end of said inclined side wall portion of said second side wall of said refuse hopper being secured to said first side of said rear wall of said refuse hopper;
   (e) said forward end of said inclined side wall portion of said second side wall of said refuse hopper being secured to said first side of said front wall of said refuse hopper;
   said bottom wall of said refuse hopper being secured to and extending horizontally between said lower end of said front wall of said refuse hopper, said lower end of said inclined side wall portion of said first side wall of said refuse hopper, said lower end of said inclined side wall portion of said second side wall of said refuse hopper, and said lower end of said rear wall of said refuse hopper;

an elongated first pivot plate having an upper end, a lower end, a front end and a rear end;

said first pivot plate being secured to said outer side of said rear wall of said refuse hopper at said first side thereof;

an elongated second pivot plate having an upper end, a lower end, a front end and a rear end;

said second pivot plate being secured to said outer side of said rear wall of said refuse hopper adjacent said first pivot plate;

an elongated third pivot plate having an upper end, a lower end, a front end and a rear end;

said third pivot plate being secured to said outer side of said rear wall of said refuse hopper at said second side thereof;

an elongated fourth pivot plate having an upper end, a lower end, a front end and a rear end;

said fourth pivot plate being secured to said outer side of said rear wall adjacent said third pivot plate;

said first and second pivot plates being pivotally secured to said first bearing on said upper end of said first hopper support;

said third and fourth pivot plates being pivotally secured to said second bearing on said upper end of said second hopper support;

a first hydraulic cylinder having a base end and a rod end;

said base end of said first hydraulic cylinder being pivotally secured to said support frame;

said rod end of said first hydraulic cylinder being pivotally secured to said first and second pivot plates;

a second hydraulic cylinder having a base end and a rod end;

said base end of said second hydraulic cylinder being pivotally secured to said support frame;

said rod end of said second hydraulic cylinder being pivotally secured to said third and fourth pivot plates;

the extension of said first and second hydraulic cylinders causing said refuse hopper to pivotally move from a loading position towards a rearward dumping position;

a compactor plate having an upper end, a lower end, a first side, a second side, an inner side and an outer side;

a horizontally disposed frame means including:
  (a) an elongated and horizontally disposed first side frame member having a front end and a rear end;
  (b) said first side frame member of said frame means being positioned on said upper end of said upper side wall portion of said first side wall of said refuse hopper;
  (c) an elongated and horizontally disposed second side frame member having a front end and a rear end;
  (d) said second side frame member of said frame means being positioned on said upper end of said upper wall portion of said second side wall of said refuse hopper;
  (e) an elongated and horizontally disposed front frame member having a first end and a second end;
  (f) said front frame member of said frame means being positioned on said upper end of said front wall of said refuse hopper;
  (g) said first end of said front frame member of said frame means being secured to said front end of said first side frame member of said frame means;
  (h) said second end of said front frame member of said frame means being secured to said front end of said second side frame member of said frame means;
  (i) an elongated and horizontally disposed first rear frame member having a first and a second end;
  (j) said first end of said first rear frame member of said frame means being secured to said rear end of said first side frame member of said frame means so as to extend inwardly therefrom;
  (k) an elongated and horizontally disposed second rear frame member which has first and second ends;
  (l) said first end of said second rear frame member of said frame means being secured to said rear end of said second side frame member of said frame means so as to extend inwardly therefrom; and
  (m) said second ends of said first and second rear frame members of said frame means being spaced-apart;

a third hydraulic cylinder having a base end and a rod end;

said base end of said third hydraulic cylinder being operatively secured to said frame means;

and a linkage pivotally securing said rod end of said third hydraulic cylinder to said upper end of said compactor plate;

said compactor plate being positioned between said first and second side walls of said refuse hopper when said third hydraulic cylinder is in said extended position;

said compactor plate being in a horizontally disposed position when said third hydraulic cylinder is partially extended;

said lower end of said compactor plate being positioned at said upper end of said rear wall of said refuse hopper when said third hydraulic cylinder is partially extended; and said compactor plate being in an upright position above said refuse hopper when said third hydraulic cylinder is in said retracted position.

2. The refuse hopper of claim 1 wherein said refuse hopper has a volume of approximately 4 cubic yards.

3. The refuse hopper of claim 1 wherein said compactor plate functions as a wind screen when in said horizontally disposed position.

4. A refuse hopper for installation on a trailer having a rear end, a first end, a first side and a second side:

a horizontally disposed support frame having a front end, a rear end, a first end and a second side;

said support frame being positioned on the trailer;

said support frame including:
  (a) a horizontally disposed front frame member having a first end and a second end;
  (b) a horizontally disposed rear frame member having a first end and a second end;
  (c) a horizontally disposed first side frame member having a front end and a rear end;
  (d) said front end of said first side frame member of said support frame being secured to said first end of said front frame member of said support frame;
  (e) said rear end of said first side frame member of said support frame being secured to said first end of said rear frame member of said support frame;
  (f) a horizontally disposed second side frame member having a front end and a rear end;
  (g) said front end of said second side frame member of said support frame being secured to said second end of said front frame member of said support frame;
  (h) said rear end of said second side frame member of said support frame being secured to said second end of said rear frame member of said support frame;

(i) an upstanding first hopper support having a lower end, an upper end, a front side and a rear side;

(j) said lower end of said first hopper support of said support frame being secured to said first side frame member of said support frame at said rear end thereof;

(k) a first bearing support mounted on said upper end of said first hopper support of said support frame;

(l) a first bearing mounted on said first bearing support of said support frame;

(m) an upstanding second hopper support having a lower end, an upper end, a front side and a rear side;

(n) said lower end of said second hopper support of said support frame being secured to said second side frame member of said support frame at said rear end thereof;

(o) a second bearing support mounted on said upper end of said second hopper support of said support frame; and (p) a second bearing mounted on said second bearing support of said support frame;

a refuse hopper pivotally mounted on said support frame;

said refuse hopper being selectively movable between loading and rearward dumping positions;

said refuse hopper including a front wall, a first side wall, a second side wall, a rear wall and a bottom wall;

said front wall of said refuse hopper including:
  (a) a vertically disposed upper wall section having an upper end, a first side and a second side;
  (b) an inclined lower wall section having an upper end, a lower end, a first side and a second side;
  (c) said upper end of said inclined lower wall section of said front wall of said refuse hopper being secured to said lower end of said upper wall section of said front wall of said refuse hopper;
  (d) said inclined lower wall section of said front wall of said refuse hopper extending downwardly and rearwardly from said lower end of said upper wall section of said front wall of said refuse hopper;

said rear wall of said refuse hopper being inclined and having a lower end, an upper end, an inner side, an outer side, a first side and a second side;

said rear wall of said refuse hopper extending upwardly and rearwardly from said lower end thereof to said upper end thereof;

said first side wall of said refuse hopper including:
  (a) an inclined side wall portion having a lower end, an upper end, a forward end, a rearward end, an inner side and an outer side;
  (b) a vertically disposed upper side wall portion having a lower end, an upper end, a forward end, a rearward end, an inner side and an outer side;
  (c) said lower end of said upper side wall portion of said first side wall of said refuse hopper being secured to said upper end of said lower side wall portion of said first side wall of said refuse hopper and extending upwardly therefrom;
  (d) said rearward end of said lower side wall portion of said first side wall of said refuse hopper being secured to said first side of said rear wall of said refuse hopper;
  (e) said forward end of said lower side wall portion of said first side wall of said refuse hopper being secured to said first side of said front wall of said refuse hopper;

said second side wall including:
  (a) an inclined side wall portion having a lower end, an upper end, a forward end, a rearward end, an inner side and an outer side;
  (b) a vertically disposed upper side wall portion having a lower end, an upper end, a forward end, a rearward end, an inner side and an outer side;
  (c) said lower end of said upper side wall portion of said second side wall of said refuse hopper being secured to said upper end of said lower side wall portion of said second side wall of said refuse hopper and extending upwardly therefrom;
  (d) said rearward end of said lower side wall portion of said second side wall of said refuse hopper being secured to said first side of said rear wall of said refuse hopper;
  (e) said forward end of said lower side wall portion of said second side wall of said refuse hopper being secured to said first side of said front wall of said refuse hopper;

said horizontally disposed bottom wall of said refuse hopper being secured to and extending between said lower ends of said front wall of said refuse hopper, said lower end of said lower side wall portion of said first side wall of said refuse hopper, said lower end of said lower side wall portion of said second side wall of said refuse hopper, and said lower end of said rear wall of said refuse hopper;

an elongated first pivot plate having an upper end, a lower end, a front end and a rear end;

said first pivot plate being secured to said outer side of said rear wall at said first side thereof;

an elongated second pivot plate having an upper end, a lower end, a front end and a rear end;

said second pivot plate being secured to said outer side of said rear wall adjacent said first pivot plate;

an elongated third pivot plate having an upper end, a lower end, a front end and a rear end;

said third pivot plate being secured to said outer side of said rear wall at said second side thereof;

an elongated fourth pivot plate having an upper end, a lower end, a front end and a rear end;

said fourth pivot plate being secured to said outer side of said rear wall adjacent said third pivot plate;

said first and second pivot plates being pivotally secured to said first bearing on said upper end of said first hopper support;

said third and fourth pivot plates being pivotally secured to said second bearing on said upper end of said second hopper support;

a first hydraulic cylinder having a base end and a rod end;

said base end of said first hydraulic cylinder being pivotally secured to said support frame;

said rod end of said first hydraulic cylinder being pivotally secured to said first and second pivot plates;

a second hydraulic cylinder having a base end and a rod end;

said base end of said second hydraulic cylinder being pivotally secured to said support frame;

said rod end of said second hydraulic cylinder being pivotally secured to said third and fourth pivot plates;

the extension of said first and second hydraulic cylinders causing said hopper to pivotally move from said loading position towards said rearward dumping position;

a compactor plate having an upper end, a lower end, a first side, a second side, an inner side and an outer side;

a horizontally disposed frame means including:

(a) an elongated and horizontally disposed first side frame member having a front end and a rear end;
(b) said first side frame member of said frame means being positioned on said upper end of said upper side wall portion of said first side wall of said refuse hopper;
(c) an elongated and horizontally disposed second side frame member having a front end and a rear end;
(d) said second side frame member of said frame means being positioned on said upper end of said upper wall portion of said second side wall of said refuse hopper;
(e) an elongated and horizontally disposed front frame member having a first end and a second end;
(f) said front frame member of said frame means being positioned on said upper end of said front wall of said refuse hopper;
(g) said first end of said front frame member of said frame means being secured to said front end of said first side frame member of said frame means;
(h) said second end of said front frame member of said frame means being secured to said front end of said second side frame member of said frame means;
(i) an elongated and horizontally disposed first rear frame member which has first and second ends;
(j) said first end of said first rear frame member of said frame means being secured to said rear end of said first side frame member of said frame means so as to extend inwardly therefrom;
(k) an elongated and horizontally disposed second rear frame member which has first and second ends;
(l) said first end of said second rear frame member of said frame means being secured to said rear end of said second side frame member of said frame means so as to extend inwardly therefrom;
(m) said second ends of said first and second rear frame members of said frame means being spaced-apart;
a third hydraulic cylinder having a base end and a rod end;
said base end of said third hydraulic cylinder being operatively secured to said frame means;
and a linkage pivotally securing said rod end of said third hydraulic cylinder to said upper end of said compactor plate;
said compactor plate being positioned between said first and second side walls when said third hydraulic cylinder is in said extended position;
said compactor plate being in a horizontally disposed position when said third hydraulic cylinder is partially extended;
said lower end of said compactor plate being positioned at said upper end of said rear wall of said refuse hopper when said third hydraulic cylinder is partially extended; and
said compactor plate being in an upright position above said hopper when said third hydraulic cylinder is in said retracted position.

5. The refuse hopper of claim 4 wherein said hopper has a volume of approximately four cubic yards.

6. The refuse hopper of claim 4 wherein said compactor plate functions as a wind screen when in said horizontally disposed position.

* * * * *